Aug. 26, 1924.
K. P. HANGL
BRAKE
Filed June 16, 1923
1,506,582
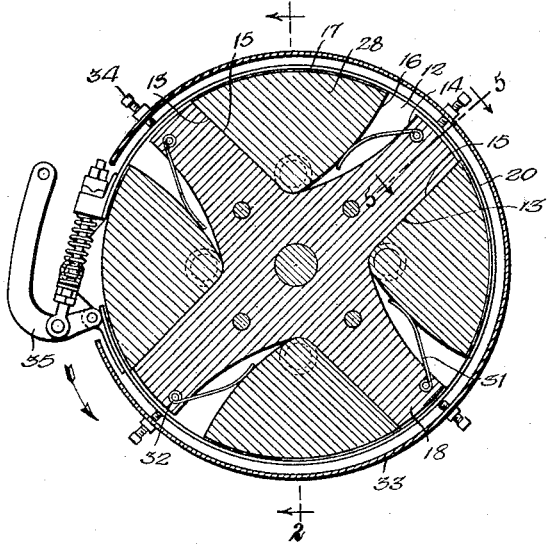
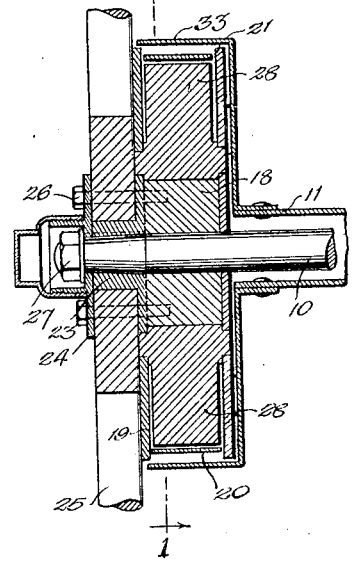
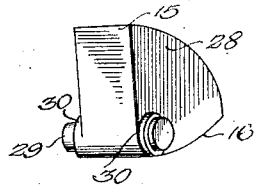
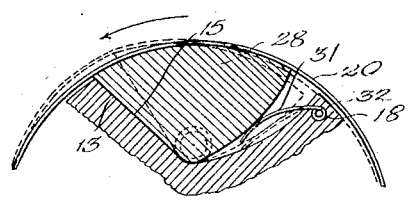
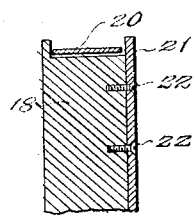
WITNESSES
INVENTOR
KARL P. HANGL
ATTORNEYS Patented Aug. 26, 1924.

1,506,582

UNITED STATES PATENT OFFICE.

KARL P. HANGL, OF NEW YORK, N. Y.

BRAKE.

Application filed June 16, 1923. Serial No. 645,856.

*To all whom it may concern:*

Be it known that I, KARL P. HANGL, a citizen of the United States, and a resident of the city of New York, borough of the Bronx, in the county of Bronx and State of New York, have invented new and useful Improvements in Brakes, of which the following is a full, clear, and exact description.

This invention relates to brakes and was primarily designed for use as a vehicle brake.

In the use of motor vehicles many accidents occur owing to the fact that the brakes do not grip quickly or firmly enough to stop the vehicle at the proper moment when an emergency arises. This lack of instant positive action is usually due to the fact that the braking action of most vehicle brakes depends entirely upon contraction or expansion of the brake band.

The general object of this invention is the provision of a simply constructed and durable brake that gives a double braking action when operated.

This object is accomplished by providing a casing, encircling the casing by a brake band, mounting in the casing a plurality of brake blocks normally retained out of engagement with the brake band but so mounted that upon the operation of the brake band bringing it into contact with the brake blocks, the latter are moved outward against the brake band.

This and other objects of the invention will be more clearly understood from the following detailed description and accompanying drawings.

Figure 1 is a vertical transverse section along the line 1—1, Figure 2, showing the construction of the brake;

Figure 2 is a vertical longitudinal section along the line 2—2, Figure 1;

Figure 3 is a perspective view of a brake block;

Figure 4 is a vertical section of a portion of the brake showing by dotted lines the movement of the brake block when the brake band is operated;

Figure 5 is a section along the line 5—5, Figure 1, showing the construction of a portion of the casing.

Referring to the above-mentioned drawings, the invention includes a body 18, somewhat resembling a cross and a circular plate 19 formed integral with the body and extending slightly beyond the ends of the arms of the cross, presenting a rim 17. A plate 21, equal in size to the plate 19, is mounted on the opposite side of the body 18 to the plate 19, and fixed thereto by means of screws 22. Thus a plurality of pockets 12 are formed between the arms of the cross. In forming the cross, the forward side of each arm, turning counterclockwise as viewed in Figure 1, is curved as shown at 14, while the rear side 13 is straight. Openings are provided in the members 21, 19 and 18 for receiving the axle 10.

Formed on the outer face of the plate 19 is a sleeve 23 which in conjunction with a flange 24 provides a hub for the spokes 25. Screw bolts 26 project through the flange 24 and spokes 25 into the body 18, firmly clamping the spokes in position. The whole assemblage including the body 18 and the hub and spokes carried thereby is retained in position on the axle 10 by a nut 27.

A plurality of brake blocks 28 are mounted in the pockets 12. In forming a brake block it is given a shape somewhat similar to the segment of a circle with the exception that the side 16 is curved to conform to the curve of the forward faces 14 of the arms of the cross. The sides 15 of the brake blocks are straight, conforming to the rear faces 13 of the arms of the cross. Trunnions 29 having trunnion collars 30 formed thereon at their juncture with the brake block 28 are provided at the apex where the sides 15 and 16 meet. These trunnions seat in bearings provided in the plates 19 and 21, thus pivotally mounting the brake blocks in the pockets 12. Springs 31 are mounted on pins 32 provided in the body and act upon the brake blocks 28, projecting them forward so that the faces 15 of the brake blocks seat on the rear faces of the arms of the cross.

A brake band 20 encircles the body 18 and the brake block 28. The brake assemblage is enclosed by a housing 33 mounted on the casing 11. Mounted in the housing 33 and spaced about the brake band 20 are a plurality of set screws 34. These set screws are provided for compelling the brake band to regain its original shape after it has been released from the brake blocks. Associated with the brake band 20 is a lever 35 for operating the former.

In constructing this brake, particularly when it is intended for use on heavy vehicles, the body and plate 19 would be cast. But in forming the brake for mounting on light vehicles the body 18 could be stamped from sheet metal. In constructing the body from sheet metal slight differences in the design of the cross and plate 19 would be necessary but the features of the construction would remain the same.

If the wheel is rotating counterclockwise, as shown in Figure 1, and the brake band is contracted by the operation of the lever 35 it engages the brake blocks 28. Immediately the brake blocks turn about their pivot points, projecting the forward end outward against the brake band. Thus I get a double action consisting of the drawing of the brake band in against the brake blocks and the projecting of the brake blocks outward against the brake band. This gives a quick and positive action of the brake. When the brake band has been released, expanding it, it is forced to regain its original shape by the set screws 34. The springs 31 project the brake blocks 28 back to their original positions and retain them out of engagement with the brake band. The normal position of the brake blocks 28 is shown in Figures 1 and 4 by full lines, while the braking position is shown by dotted lines.

I would state in conclusion that while the illustrated example constitutes a practical embodiment of my invention I do not limit myself strictly to the exact details herein illustrated, since manifestly the same can be considerably varied without departing from the spirit of the invention as defined in the appended claims.

Claims.

1. A vehicle brake, comprising a casing having pockets formed therein, brake blocks pivotally mounted in said pockets, and a brake band encircling said brake blocks.

2. A vehicle brake, comprising a circular casing having a plurality of pockets formed therein, a plurality of brake blocks pivotally mounted in said pockets, said pivot points of the brake blocks being so positioned that the blocks project beyond the periphery of the casing when rotated in one direction, and a brake band encircling the casing and blocks to grip the same.

3. A brake for vehicle wheels, comprising a casing for mounting on the vehicle wheel, said casing having a plurality of pockets therein, a brake band encircling said casing, and members mounted in the casing pockets, said members being so constructed that they swing outward against the brake band when engaged by the latter.

4. In a brake for vehicle wheels including a casing having a plurality of pockets formed therein and a brake band encircling said casing, means for co-operating with the brake band to give a braking action, comprising a plurality of brake blocks pivotally mounted in said pockets, the pivot points of said brake blocks being so positioned that when the brake blocks are rotated about their pivot points by the action of the brake band they swing outward against the brake band, and means for retaining the brake blocks out of engagement with the brake band when the latter is in its normal position.

5. A brake for vehicle wheels, comprising a casing having a plurality of pockets formed therein, a brake band encircling the casing, and means mounted in said pockets for projecting outward against the brake band when engaged by the brake band.

6. A brake, comprising a casing having a plurality of pockets formed therein, a brake band encircling said casing, means mounted in the pockets for projecting outward against said brake band when engaged by the latter, and means for moving said brake band engaging means out of engagement with the brake band when the latter is returned to its normal position.

7. A brake band for vehicle wheels, comprising a casing for mounting on the vehicle wheels, said casing having a plurality of pockets therein, means mounted on said pockets for projecting outward against said brake band when the latter is contracted, and means for normally retaining the brake band engaging means mounted in the pockets out of engagement with the brake band.

8. A brake for vehicle wheels, comprising a casing having a plurality of pockets formed therein, a brake band encircling the casing, brake blocks mounted in said pockets and adapted for projecting outward against the brake band when engaged by the latter, means for normally retaining the brake blocks out of engagement with the brake band, and means for giving the brake band its normal position when released from said brake blocks.

9. A brake for vehicle wheels comprising a casing having a plurality of pockets formed therein, a brake band encircling said casing, brake blocks mounted in the pockets, said brake blocks being adapted for projecting outward against the brake band when engaged by the latter, springs for normally retaining the brake blocks out of engagement with the brake band, and means for giving the brake band its normal shape when it is released from the brake blocks.

10. In a vehicle wheel brake, comprising a casing for mounting on the vehicle wheel, and a brake band encircling said casing, means for co-operating with the brake band to give the braking action, comprising brake blocks, and means for pivotally mounting said brake blocks in the casing and spacing them from the side walls of said casing so as to cut down friction when the brake blocks are rotated about their pivot points.

11. A vehicle wheel brake, comprising a casing for mounting on the vehicle wheel, said casing having a plurality of pockets formed therein, a brake band encircling the casing, brake blocks mounted in the pockets, said brake blocks being adapted for projecting outward against the brake band when engaged by the latter, springs mounted in the casing for normally retaining the brake blocks out of engagement with the brake band, and adjustable means co-operating with the brake band for compelling it to conform to its original shape when released from said brake blocks.

12. A brake for vehicle wheels, comprising a disk-shaped body having a plurality of pockets formed therein extending inward from its periphery, a brake band encircling said body, a plurality of brake blocks mounted in the pockets, said brake blocks being adapted for projecting outward against the brake band when engaged by the latter, springs mounted in the body for normally retaining the brake blocks out of engagement with the brake band, a casing enclosing said body and brake band, and adjustable means mounted in the casing for co-operating with the brake band to return it to its normal shape when released from said brake blocks.

KARL P. HANGL.